(12) United States Patent
Frensch

(10) Patent No.: US 12,066,966 B2
(45) Date of Patent: Aug. 20, 2024

(54) DAISY CHAIN CONFIGURATION USING PRIORITY VALUES

(71) Applicant: Infineon Technologies AG, Neubiberg (DE)

(72) Inventor: Ewald Frensch, Kissing (DE)

(73) Assignee: Infineon Technologies AG, Neubiberg (DE)

( * ) Notice: Subject to any disclaimer, the term of this patent is extended or adjusted under 35 U.S.C. 154(b) by 295 days.

(21) Appl. No.: 17/647,906

(22) Filed: Jan. 13, 2022

(65) Prior Publication Data

US 2023/0222081 A1     Jul. 13, 2023

(51) Int. Cl.
*G06F 13/40*          (2006.01)

(52) U.S. Cl.
CPC ................................ *G06F 13/4031* (2013.01)

(58) Field of Classification Search
CPC .. G06F 13/4031; G06F 13/4247; G06F 13/37; G06F 13/4282
See application file for complete search history.

(56) References Cited

U.S. PATENT DOCUMENTS

| 7,966,443 B2 * | 6/2011 | Grundy | G06F 13/4256 |
| | | | 710/316 |
| 2009/0063786 A1 * | 3/2009 | Oh | G06F 13/1684 |
| | | | 711/148 |
| 2017/0034277 A1 * | 2/2017 | Jackson | H04L 12/46 |
| 2019/0196998 A1 * | 6/2019 | Koike | G06F 13/374 |
| 2019/0342225 A1 * | 11/2019 | Sanghi | H04L 45/30 |
| 2020/0059945 A1 * | 2/2020 | Park | H04W 4/029 |
| 2022/0327077 A1 * | 10/2022 | Teferi | G06F 9/321 |

* cited by examiner

*Primary Examiner* — Phong H Dang
(74) *Attorney, Agent, or Firm* — Shumaker & Sieffert, P.A.

(57) ABSTRACT

A device configured to receive a set of bits for a first package from a previous device of a plurality of devices connected in a daisy chain configuration, the set of bits for the first package including a first priority value and if the device does not have a second package for output to a destination device of the plurality of devices, output the set of bits for the first package to a subsequent device of the plurality of devices. When the device has the second package for output to the destination device of the plurality of devices, the device is configured to determine whether the second priority value is higher than the first priority value and if the second priority value is higher than the first priority value output a set of bits for the second package to the subsequent device of the plurality of devices.

18 Claims, 5 Drawing Sheets

DAISY CHAIN CONFIGURATION USING PRIORITY VALUES

TECHNICAL FIELD

This disclosure relates to serial device communication, and in particular, to daisy chain communication.

BACKGROUND

Devices may be arranged in a daisy chain configuration to permit communication between the devices. For example, a source device of the daisy chain configuration may output data to a destination device arranged in the daisy chain configuration. The source device outputs the data to a subsequent device arranged in the daisy chain configuration, which outputs the data to another subsequent device arranged in the daisy chain configuration, and so on until the data from the source device is forwarded to the destination device. In this manner, the devices may communicate with each other without requiring independent connections.

SUMMARY

The disclosure describes techniques, devices, and systems for daisy chain communication. For example, a device connected in a daisy chain configuration may only output a package when the package has a higher priority than a package being received by the device. In this way, devices connected in the daisy chain configuration may deterministically ensure that packages are sent according to priority, which may help to ensure that high priority packages are transmitted within a pre-configured delay. Transmitting high priority packages within the pre-configured delay may help to improve or enable the use of the daisy chain communication.

In some examples, the disclosure is directed to a device configured to receive a set of bits for a first package from a previous device of a plurality of devices connected in a daisy chain configuration, the set of bits for the first package including a first priority value and if the device does not have a second package for output to a destination device of the plurality of devices connected in the daisy chain configuration, output the set of bits for the first package to a subsequent device of the plurality of devices connected in the daisy chain configuration. When the device has the second package for output to the destination device of the plurality of devices connected in the daisy chain configuration, the device is configured to determine whether a second priority value for the second package is higher than the first priority value. If the second priority value is higher than the first priority value, the device is configured to refrain from outputting the set of bits for the first package to the subsequent device of the plurality of devices connected in the daisy chain configuration and output a set of bits for the second package to the subsequent device of the plurality of devices connected in the daisy chain configuration.

In some examples, the disclosure is directed to a method comprising receiving, by a device, a set of bits for a first package from a previous device of a plurality of devices connected in a daisy chain configuration, the set of bits for the first package including a first priority value. The method further includes, if the device does not have a second package for output to a destination device of the plurality of devices connected in the daisy chain configuration, outputting, by the device, the set of bits for the first package to a subsequent device of the plurality of devices connected in the daisy chain configuration. The method further includes, when the device has the second package for output to the destination device of the plurality of devices connected in the daisy chain configuration, determining, by the device, whether a second priority value for the second package is higher than the first priority value. The method further includes, if the second priority value is higher than the first priority value, refraining, by the device, from outputting the set of bits for the first package to the subsequent device of the plurality of devices connected in the daisy chain configuration and outputting, by the device, a set of bits for the second package to the subsequent device of the plurality of devices connected in the daisy chain configuration.

In some examples, the disclosure is directed to a system including a plurality of devices connected in a daisy chain configuration. The plurality of devices include a previous device, a device, and a subsequent device. The device is configured to receive data from the previous device and to transmit data to the subsequent device. The device is configured to receive a set of bits for a first package from the previous device of the plurality of devices connected in the daisy chain configuration, the set of bits for the first package including a first priority value. If the device does not have a second package for output to a destination device of the plurality of devices connected in the daisy chain configuration, the device is configured to output the set of bits for the first package to the subsequent device of the plurality of devices connected in the daisy chain configuration. When the device has the second package for output to the destination device of the plurality of devices connected in the daisy chain configuration, the device is configured to determine whether a second priority value for the second package is higher than the first priority value. If the second priority value is higher than the first priority value, the device is configured to refrain from outputting the set of bits for the first package to the subsequent device of the plurality of devices connected in the daisy chain configuration and output a set of bits for the second package to the subsequent device of the plurality of devices connected in the daisy chain configuration.

The details of one or more examples are set forth in the accompanying drawings and the description below. Other features, objects, and advantages of the disclosure will be apparent from the description and drawings, and from the claims.

DETAILED DESCRIPTION

Some communication systems may have restrictions in one or more of data bandwidth, real-time behavior, determinism, or cabling requests. In an example automotive application, may different communication/bus systems may be used concurrently, with each communication/bus system being optimized for a particular application. For example, a system may be optimized using one or more of a controller area network (CAN) bus, a FlexRay bus, a media oriented systems transport (MOST) bus, Ethernet, or another communication medium.

Some applications, for example, self-driving automobiles, may rely on an optimization of all of data bandwidth, real-time behavior, determinism, and cabling requests. As used herein, determinism may refer to when a maximum delay can be determined for communicating data from a device in a daisy chain configuration with a number of devices. For example, data communication in vehicles may include bandwidth demands that are increasing rapidly due to features, such as, for example, high quality infotainment systems (e.g., audio and/or video streaming), augmented reality, high level driver assistance, or autonomous driving. Additionally, it may be desirable to limit a number of wires in the vehicle due to weight limitations. The data communication in vehicles may frequently be transmitted in real-time. To address the foregoing issues and concerns, some systems (e.g., Ethernet with switches) may rely on a combination of increasing a number of wires, adding hardware, and omitting real-time transmission of data communications. Other systems (e.g., BroadR-Reach) may limit bandwidth (e.g., field busses) or rely on complex electronics.

In accordance with the techniques of the disclosure, a system may apply a data channel topology and a corresponding package scheduling that helps to enable real-time data transmissions over a single physical channel (e.g. a single pair cable). The data channel topology of the bus may be a daisy chain ring. In contrast to classical ring wiring (e.g. ethernet), no master and no token may necessarily be used. For example, a device connected in a daisy chain configuration may only output a package when the package has a higher priority than a package being received by the device. In this way, devices connected in the daisy chain configuration may deterministically ensure that packages are sent according to priority, which may help to ensure real-time behavior and determinism without relying on increasing a number of wires and/or decreasing data bandwidth. Determinism may refer to when a maximum delay can be determined for communicating data from a device with a priority in a daisy chain configuration with a number of devices. For example, a maximum delay for starting to transmit data from a device with a highest priority of devices in the daisy chain configuration may be calculated based on a number of bytes in a header (e.g., 32 bytes) times a number of devices in the daisy chain configuration.

Figure 1:
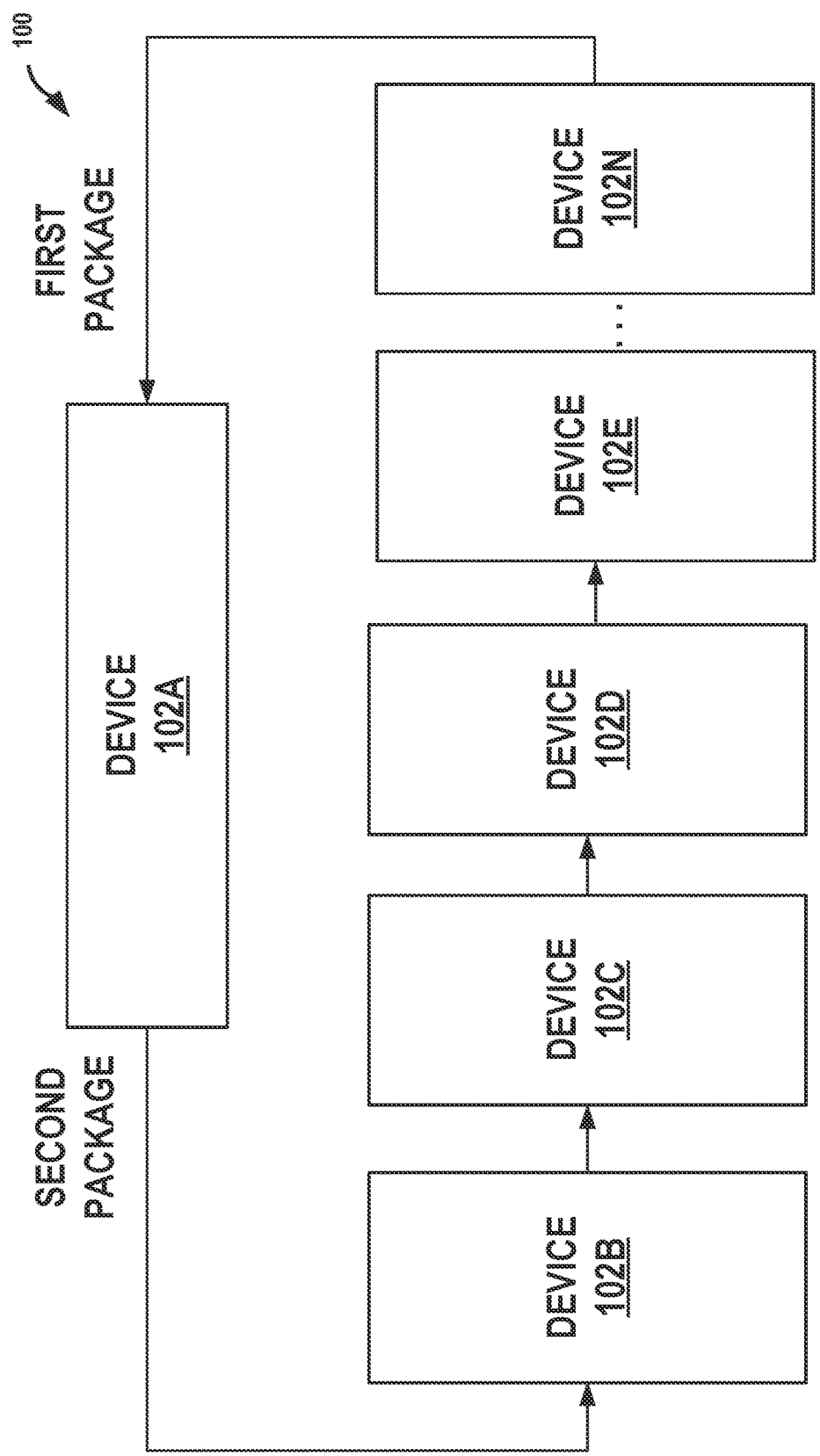
FIG. 1 is a block diagram illustrating an example system configured for daisy chain communication, in accordance with one or more techniques of this disclosure.

FIG. 1 is a block diagram illustrating an example system configured for daisy chain communication, in accordance with one or more techniques of this disclosure. As shown, system 100 includes device 102A, 102B, 102C, 102D, 102E, . . . , 102N (collectively "devices 102"), however system 100 may include additional or fewer devices than those shown in FIG. 1.

Devices 102 may be configured to operate in daisy chain communication. Device 102 may include a microcontroller on a single integrated circuit containing a processor core, memory, inputs, and outputs. For example, each of devices 102 may include one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. In some examples, each of devices 102 may be a combination of one or more analog components and one or more digital components.

In accordance with the techniques of the disclosure, each of devices 102 receives a package (e.g., a frame) from a previous device in the daisy chain communication and determines whether that device is a destination of the package. If a device is a destination of the package, then the device decodes a payload of the package, processes a payload (e.g., a 1 GB payload) of the package, and propagates the package to a subsequent device. If the device is a not a destination of the package, then the device propagates the package to a subsequent device without processing the payload of the package. For example, device 102A may receive a set of bits for a first package from device 102N, which represents a previous device of devices 102 connected in a daisy chain configuration. The set of bits for the first package may include a first priority value. If device 102A does not have a second package for output to a destination device of devices 102, device 102A may output the set of bits for the first package to device 102B, which represents a subsequent device of devices 102.

The device of devices 102 may be assigned a transmission priority. For example, device 102A may have the highest priority and device 102N may have the lowest priority. The transmission priority assigned to each device of devices 102 may be independent of an order of the devices in the daisy chain. For example, device 102A may be assigned the highest priority and device 102D may be assigned the lowest priority. Each priority may be assigned only once, for example, by an administrator. If more than one device of devices 102 has a package to transmit at the same time, then the device with the lower priority will have to wait until all other device with a higher priority have completed transmission of their packages.

For example, when device 102A has a second package for output to the destination device of devices 102, device 102A may determine whether a second priority value for the second package is higher than the first priority value for the first package. The second priority value may be different from each respective priority value assigned to other devices of devices 102. The first priority value may be assigned to a source device of devices 102 that generated the first package. If the second priority value is higher than the first priority value, device 102A may refrain from outputting the set of bits for the first package to device 102B and output a set of bits for the second package to 102B.

Note that if device 102A receives a first package transmitted originally by a lower priority device, for example device 102C, and hence with a priority value lower than that of device 102A, the device 102A does not need to continue to transmit the first package of lower priority if device 102A wishes to transmit a second package itself. Device 102A may simply replace the received first package with its own second package. Device 102A then simply passes the second package to the next device on the ring, in the example device 102B. Of course, this will interrupt the transmission from device 102C.

In this regard, also note that the packages are forwarded around the ring formed by devices 102 also by the destination device and hence the package will complete the circuit around the ring unless its transmission is interrupted. In the case that the device 102C transmits a first package but that this first package does not complete the circuit of the ring because the transmission is preempted by a higher priority device 102A, device 102C notes that it does not receive the first package and that therefore device 102C cannot be sure that the first package has been received by its destination. Device 102C can then attempt to retransmit the first package later, for example as soon as no higher priority package is present on the ring. If device 102C transmits the first package and this goes around the ring and is received again by device 102C, device 102C may determine that data for the first package has not been interrupted and device 102C can then continue to transmit data until device 102C has no more data to transmit or until it is interrupted.

If no device of devices 102 demands transmission after the last transmission was finished, then the device (for example 102C) that has transmitted the last frame will initiate a new transmission with an empty frame and a lowest priority for the daisy chain configuration (e.g., a priority of 0). The empty frame may be overridden by any of devices 102 (even by the least prioritized device of devices 102). For example, after device 102A has output all of the data for a payload of the second package to device 102B and received the data for the payload of the second package from device 102N, device 102A may determine that the destination device (e.g., one of devices 102B-102N) has received the second package. In this example, device 102A may output an empty frame with a priority of 0.

For example, after transmitting the set of bits for the second package, device 102A may receive, from a previous device (e.g., a device 102N) a set of bits for a third package including a third priority value that is higher than the second priority value for the second package. In this example, device 102A may refrain from outputting the set of bits for the second package to the subsequent device (e.g., device 102B) and output the set of bits for the third package to the subsequent device. After transmitting the set of bits for the third package to the subsequent device, device 102A may receive, from the previous device, a set of bits for a fourth package including a fourth priority value (e.g., a package from another one of devices 102 or an empty frame). In this example, if the second priority value is higher than the fourth priority value, device 102A may refrain from outputting the set of bits for the fourth package and output bits for the second package (e.g., retransmit) to the subsequent device.

Devices 102 may send a package to include a frame (e.g., an Ethernet frame) with a set of bits (e.g., a byte) that indicates an index (e.g., a priority of the frame that demands the next transmission). Devices 102 may use the frame (e.g., Ethernet frame) plus one byte (or word or double word) that includes the priority of the currently transmitted data. Devices 102 may place the index at the beginning of the frame. If a particular device of devices 102 demands transmission next, then the particular device may read the priority byte and may replace the priority byte by its own (priority) index if its index has a higher priority than the current one. If the frame has finished and the demanding device still reads its own index in the (priority) field then the demanding device may start transmitting its own frame (e.g., a payload for its own frame). In this way, the demanding device may start transmitting its own frame when no device with a higher priority has demanded transmission at this point in time.

In some examples, a MOST ring is tailored for multimedia applications. For example, in a MOST ring, the data transfer may be organized by a network master and the MOST bus may use a token. That is, the MOST ring relies on a prioritization by counting the number of token passes, which may result in determinism not being ensured and a real-time behavior not being ensured. Moreover, the MOST transmission may not be pre-emptive.

Techniques described herein may implement high-speed, real-time communication with a minimum of cabling with one or more of the following, only using two wires that are standard automotive Ethernet cables, using an Ethernet frame, using a physical layer that is identical to the Ethernet protocol, efficient bandwidth usage, little or no arbitration offset, and a topology and/or scheduling that may be used with other physical layers.

Figure 2:
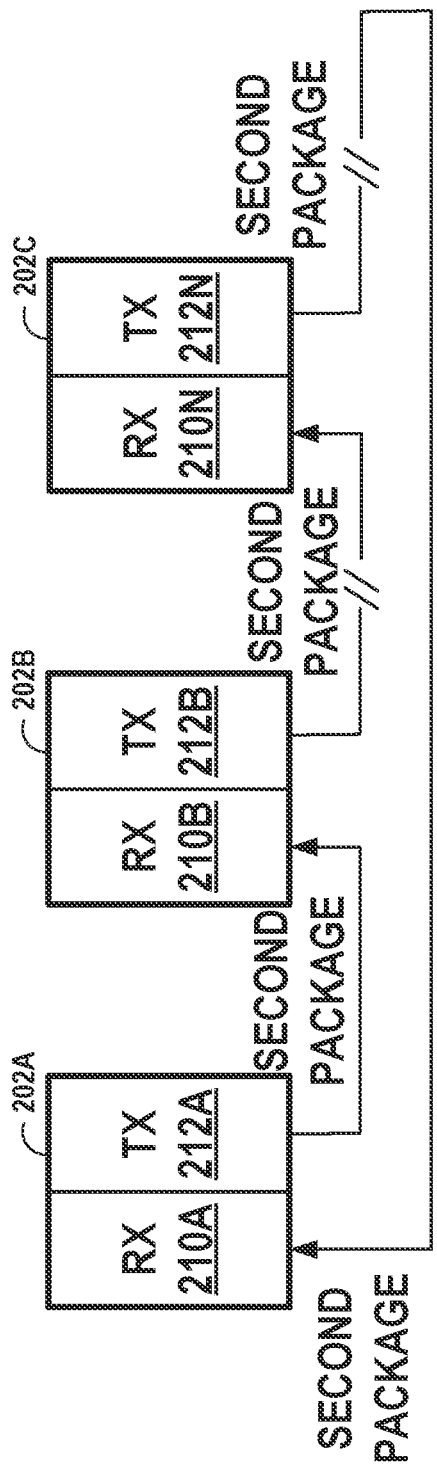
FIG. 2 is an illustration of devices connected in a daisy chain configuration, in accordance with one or more techniques of this disclosure.

FIG. 2 is an illustration of devices connected in a daisy chain configuration, in accordance with one or more techniques of this disclosure. FIG. 2 is discussed with reference to FIG. 1 for example purposes only. Devices 202A, 202B, 202C (collectively, devices 202), may be examples of devices 102 of FIG. 1. While FIG. 2 illustrates only 3 devices, other examples may include 2 devices or more than 3 devices.

In the example of FIG. 2, device 202A includes a receiver 210A and transmitter 212A, device 202B includes a receiver 210B and transmitter 212B, and device 202C includes a receiver 210C and transmitter 212C. Receivers 210A-210C (collectively, receivers 210) may be configured to receive a package from a previous device in a daisy chain configuration. Transmitters 212A-212C (collectively, transmitters 212) may be configured to transmit a package to a subsequent device in the daisy chain configuration. For example, receiver 202A may be configured to receive, via a first cable, a set of bits for the second package from the previous device (e.g., device 202C). Transmitter 202A may be configured to output, via a second cable different from the first cable, the set of bits for the second package to the subsequent device (e.g., device 202B).

In the example of FIG. 2, transmitter 212 of device 202A may output a second package to receiver 210B of device 202B. For example, a device priority unit of device 202A may determine that a second priority value for the second package is higher than a first priority value for a first package received by receiver 210A. In some examples, device 202A may determine that no other device of devices 202 has a package to transmit. For example, after transmitting the set of bits for the second package, receiver 210A may receive the set of bits for the second package from device 202C, which represents the previous device in the daisy chain configuration, after the second package has passed around devices 202 connected in the daisy chain configuration.

In the example shown in FIG. 2, transmitter 212A of device 202A may output one or more additional sets of bits for the second package based on receiving the set of bits for the second package from the previous device. For example, transmitter 212A may output a packet comprising a payload for the second package. In some examples, transmitter 212A may stream a payload for the second package.

After outputting all of the one or more additional sets of bits for the second package, transmitter 212A of device 202A may output, to the device 202B, an empty package indicating a third priority value that is less than the first priority value and less than the second priority value. For example, transmitter 212A of device 202A may output, to the device 202B, an empty package indicating a third priority value of zero. In this way, any of devices 202, including a device of devices 202 assigned a lowest priority, may transmit a new package.

Figure 3:
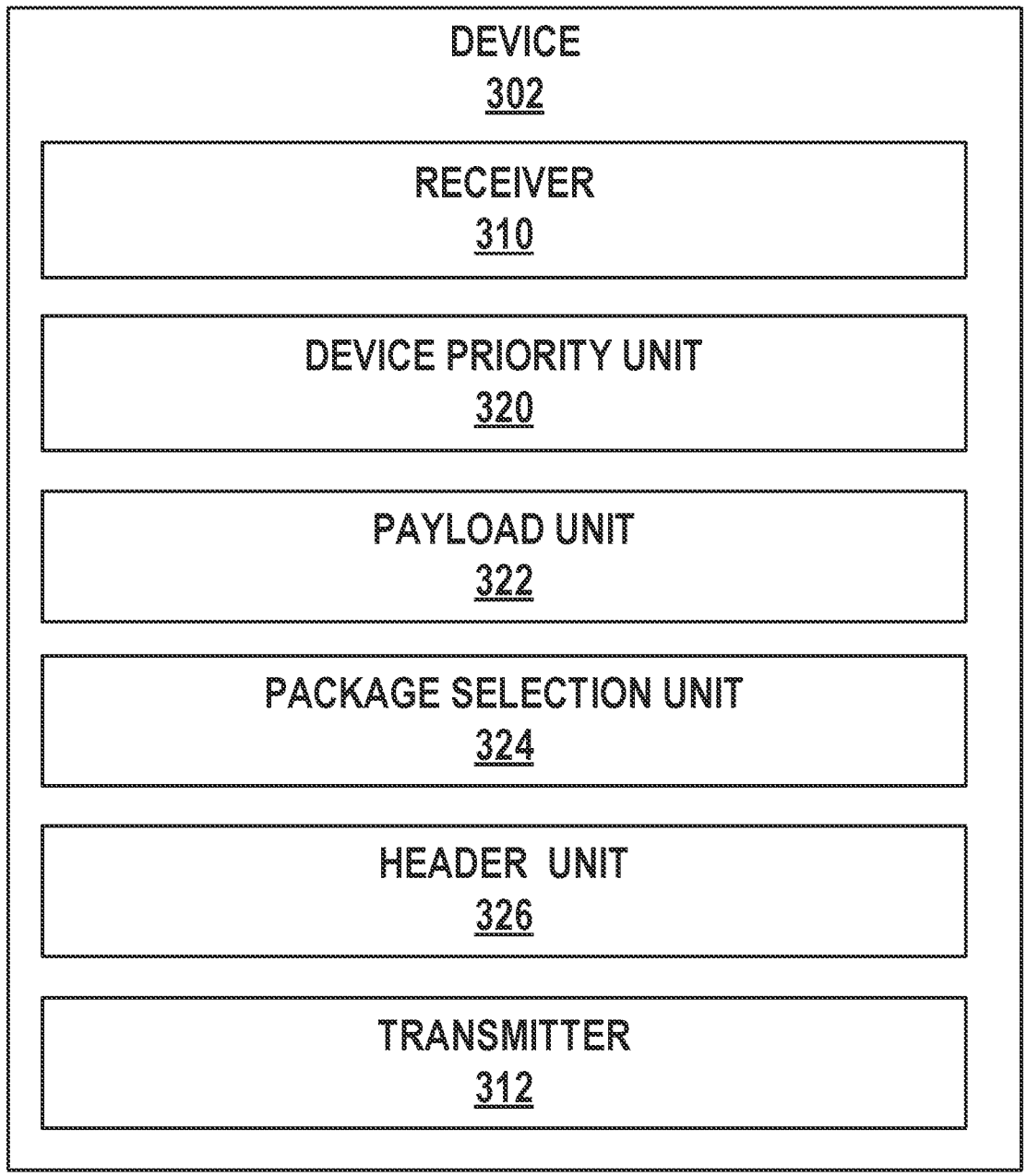
FIG. 3 is an illustration of a device, in accordance with one or more techniques of this disclosure.

FIG. 3 is an illustration of a device, in accordance with one or more techniques of this disclosure. FIG. 3 is discussed with reference to FIGS. 1-2 for example purposes only. Device 302 may be examples of a device of devices 102 of FIG. 1.

Receiver 310 may receive a package from a previous device. For example, receiver 310 may be configured to receive, via a first cable, a set of bits for the package from a previous device. Similarly, transmitter 312 may be configured to output a package to a subsequent device. For example, transmitter 312 may be configured to output, via a second cable different from the first cable, the set of bits for the package to the subsequent device.

Device priority unit 320 may be configured to store a priority value for device 302. For example, device priority unit 320 may store a priority value assigned by an administrator. Device priority unit 320 may store a pre-configured priority value. In some examples, device priority unit 320 may determine the priority value and stored the determined priority value.

Payload unit 322 may be configured to generate a package. For example, payload unit 322 may generate data for output as one or more packets to a destination device. In some examples, payload unit 322 may generate data for streaming to a destination device. Data may include, for example, sensor data, audio data, image data, textual data, or other data. In some examples, payload unit 322 may be configured to process a package. For example, in response to determining that device 302 is a destination device for a package, payload unit 322 may process a payload of the package.

Package selection unit 324 may be configured to determine whether a second priority value for a second package generated by payload unit 322 is higher than a first priority value for a first package received by receiver 310. If the second priority value is higher than the first priority value, package selection unit 324 may select the second package. For example, package selection unit 324 may cause transmitter 312 to refrain from outputting the set of bits for a first package received by receiver 310 to a subsequent device in the daisy chain configuration and output a set of bits for a second package generated by payload unit 322 to the subsequent device in the daisy chain configuration. If, however, the second priority value is lower than the first priority value, package selection unit 324 may select the first package received by receiver 310. For example, package selection unit 324 may cause transmitter 312 to refrain from outputting the set of bits for the second package generated by payload unit 322 to a subsequent device in the daisy chain configuration and output a set of bits for the first package received by receiver 310 to the subsequent device in the daisy chain configuration.

Header unit 326 may be configured to generate a portion of a header for a package generated by payload unit 322 that includes one or more of an indication of device 302 (e.g., a device name or device index), an indication of the destination device (e.g., a device name or device index) for the package, or a length of a payload for the package. For example, header unit 326 may generate the portion of the header to include a priority value stored by device priority unit 320. Header unit 326 may cause transmitter 312 to include the portion of the header for the package generated by payload unit 322 when transmitting the package generated by payload unit 322 to a subsequent device in the daisy chain configuration. For example, transmitter 312 may output a set of bits for the second package that indicates the priority value stored by device priority unit 320 when package selection unit 324 selects the second package.

In accordance with the techniques of the disclosure, device 302 may be configured to process a first package received by receiver 310 if the first package is for device 202A. For example, receiver 210A may receive a first package. In this example, payload unit 322 may determine that device 202A is a destination device for first package. Transmitter 312 may output the set of bits for the first package to a subsequent device in the daisy chain configuration unless payload unit 322 generated a second package for output to a destination device and a second priority value for the second package is higher than a first priority value for the first package. For example, if payload unit 322 does not have a second package to be transmitted by transmitter 312, payload unit 322 may process a payload of the first package. In this example, transmitter 312 may output the set of bits for the first package to the subsequent device in the daisy chain configuration device.

Figure 4:
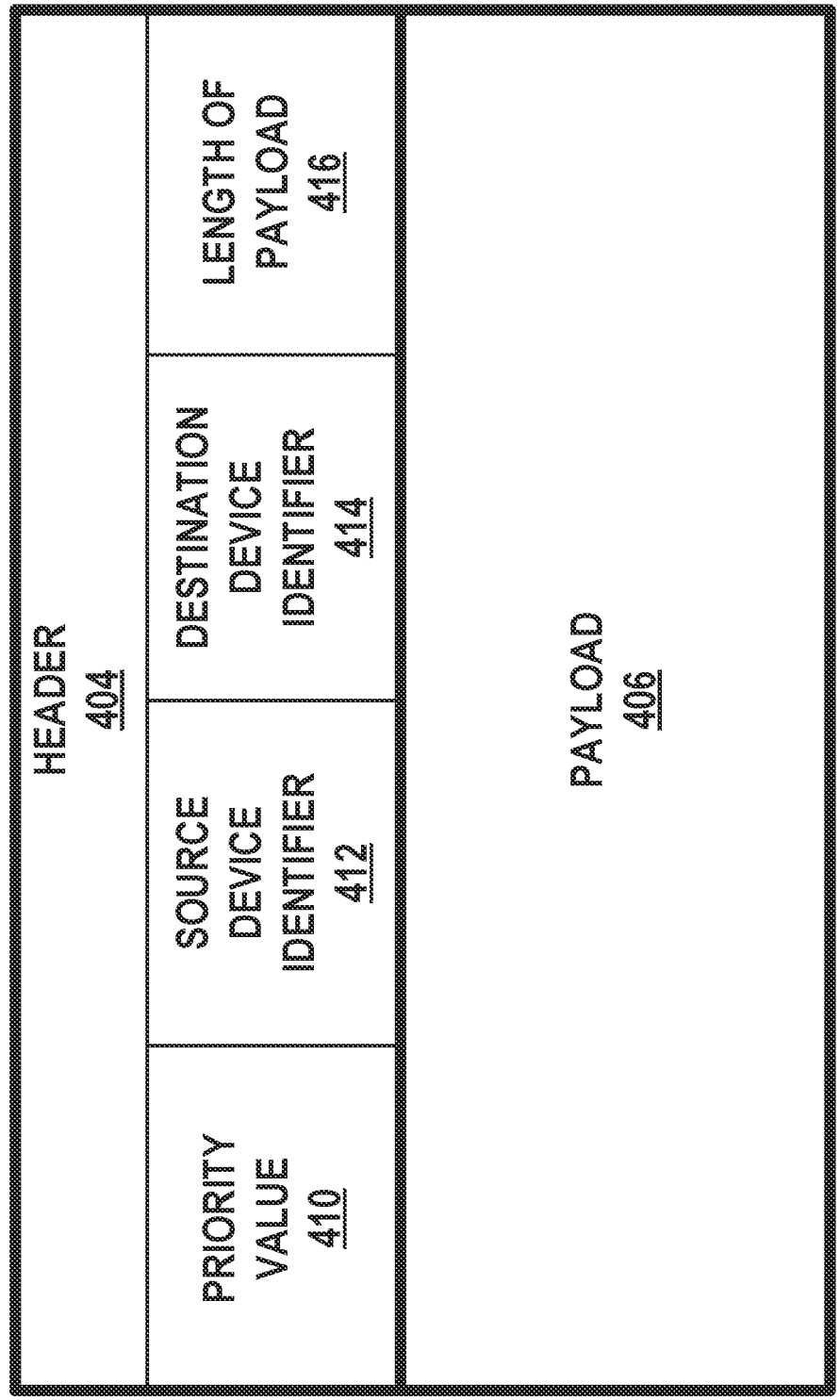
FIG. 4 is an illustration of an example package, in accordance with one or more techniques of this disclosure.

FIG. 4 is an illustration of an example package, in accordance with one or more techniques of this disclosure. FIG. 4 is discuss with FIGS. 1-3 for example purposes only. In the example of FIG. 4, package 400 includes a header 404 and payload 406. As shown, header 404 may include a priority value 410, a source device identifier 412, a destination device identifier 414, and a length of payload 416. Source device identifier 412 may indicate a device that generated payload 406. Destination device identifier 414 may indicate a device to process (e.g., decode) payload 406. Length of payload 416 may indicate a length (e.g., in bytes) of payload 406.

In some examples, device 102A may transmit a set of bits for package that indicate priority value 410 before transmitting other portions of header 404 and before transmitting payload 406. In this way, devices 102 may deterministically ensure that packages are sent according to priority, which may help to ensure real-time behavior and determinism without relying on increasing a number of wires and/or decreasing data bandwidth. For example, a maximum delay for starting to transmit data from a device with a highest priority of devices in the daisy chain configuration may be calculated based on a number of bytes in header 404 (e.g., 32 bytes) times a number of devices in the daisy chain configuration. In some examples, a maximum delay for starting to transmit data from a device with a highest priority of devices in the daisy chain configuration may be calculated based on a number of bytes in priority value 410 times a number of devices in the daisy chain configuration.

Figure 5:
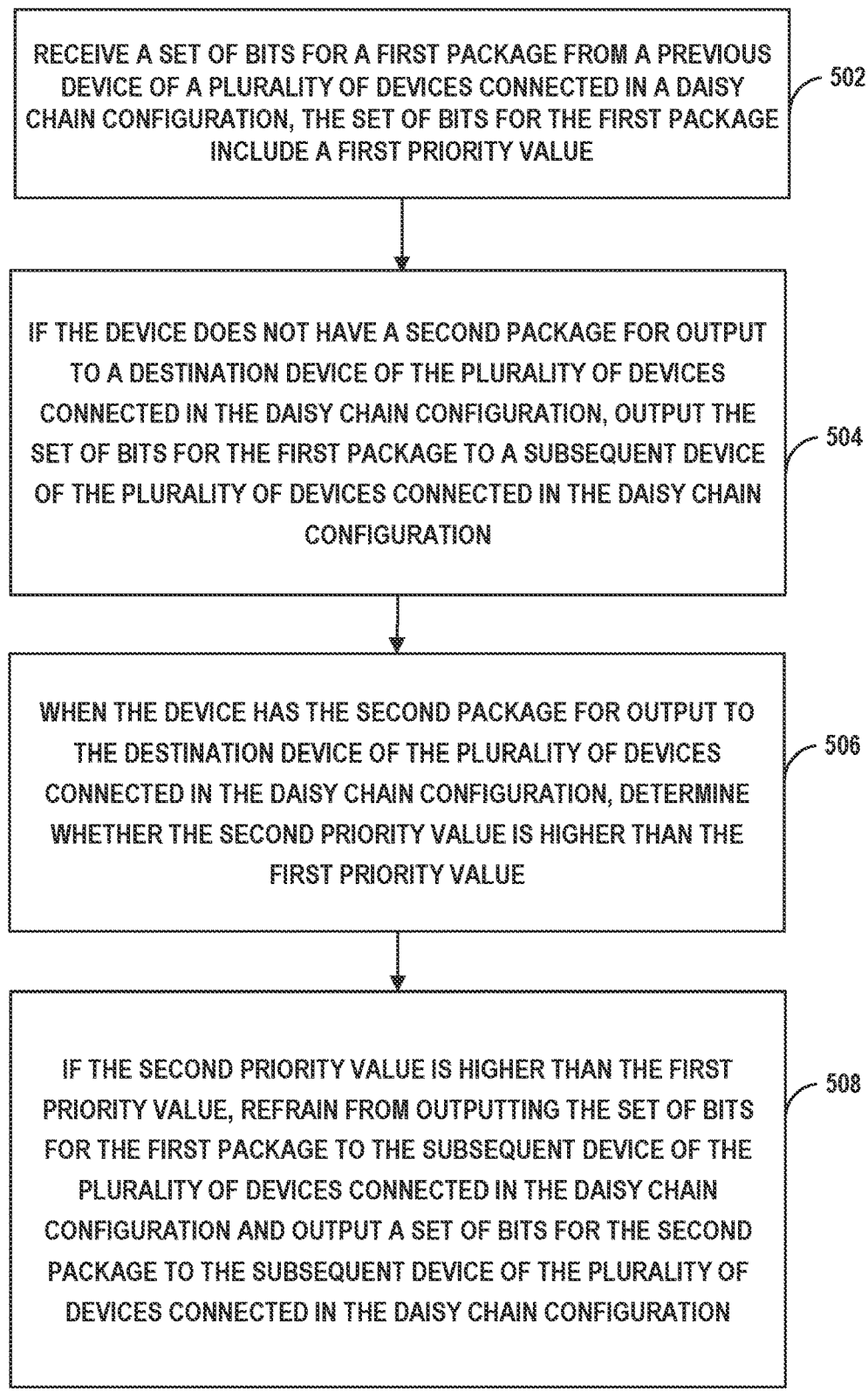
FIG. 5 is a flow diagram consistent with techniques that may be performed by a device, in accordance with this disclosure.

FIG. 5 is a flow diagram consistent with techniques that may be performed by a device in accordance with this disclosure. FIG. 5 is discuss with FIGS. 1-4 for example purposes only.

Device 102A may receive a set of bits for a first package from a previous device of a plurality of devices connected in a daisy chain configuration, the set of bits for the first package including a first priority value (502). For example, device 102A may receive, via a first cable, the first package from a previous device of the daisy chain configuration. Device 102A may be configured to output, via a second cable different from the first cable, the set of bits for a package (e.g., the first package or a second package) to a subsequent device of the daisy chain configuration. Device 102B (or another device of devices 102) may be a source device for the first package and the first priority value may be assigned to device 102B.

Device 102A may, if device 102A does not have a second package for output to a destination device of the plurality of devices connected in the daisy chain configuration, output the set of bits for the first package to a subsequent device of the plurality of devices connected in the daisy chain configuration (504). For example, device 102A may output the set of bits for the first package to device 102B if device 102A does not have a second package for output to a destination device of devices 102. If device 102B is a source device for the first package, destination device 102 may output an empty package indicating a third priority value (e.g., 0) that is less than the priority value assigned to devices 102A.

When device 102A has the second package for output to the destination device of the plurality of devices connected in the daisy chain configuration, device 102A may determine whether a second priority value for the second package is higher than the first priority value (506). For example, if the second priority value is lower than the first priority value, device 102A may output the set of bits for the first package to device 102B. If device 102B is a source device for the first package, destination device 102 may output an empty package indicating a third priority value (e.g., 0) that is less than the first priority value and less than the second priority value (e.g., less than the priority value assigned to devices 102A). The second priority value may be different from each respective priority value assigned to other devices of devices 102.

Device 102A may, if the second priority value is higher than the first priority value, refrain from outputting the set of bits for the first package to the subsequent device of the plurality of devices connected in the daisy chain configuration and output a set of bits for the second package to the subsequent device of the plurality of devices connected in the daisy chain configuration (508). For example, if the second priority value is higher than the first priority value, device 102A may output the set of bits for the second package to device 102B. For instance, device 102A may output a packet comprising a payload for the second package. In some instances, device 102A may stream a payload for the second package to device 102B. The second package may include a portion of a header to indicate the second priority value for the second package.

The following clauses may illustrate one or more aspects of the disclosure.

Clause 1. A device configured to: receive a set of bits for a first package from a previous device of a plurality of devices connected in a daisy chain configuration, the set of bits for the first package including a first priority value; and if the device does not have a second package for output to a destination device of the plurality of devices connected in the daisy chain configuration, output the set of bits for the first package to a subsequent device of the plurality of devices connected in the daisy chain configuration; and when the device has the second package for output to the destination device of the plurality of devices connected in the daisy chain configuration: determine whether the second priority value is higher than the first priority value; if the second priority value is higher than the first priority value: refrain from outputting the set of bits for the first package to the subsequent device of the plurality of devices connected in the daisy chain configuration; and output a set of bits for the second package to the subsequent device of the plurality of devices connected in the daisy chain configuration.

Clause 2. The device of clause 1, wherein the device is configured to process the first package if the first package is for the device, and to output the set of bits for the first package to the subsequent device of the plurality of devices connected in the daisy chain configuration unless the device has the second package for output to the destination device and if the second priority value is higher than the first priority value.

Clause 3. The device of any of clauses 1-2, wherein the device is configured to, if the second priority value is lower than the first priority value, output the set of bits for the first package to the subsequent device of the plurality of devices connected in the daisy chain configuration.

Clause 4. The device of any of clauses 1-3, wherein the device is further configured to: after transmitting the set of bits for the second package, receive the set of bits for the second package from the previous device after the second package has passed around the plurality of devices connected in the daisy chain configuration; and output one or more additional sets of bits for the second package based on receiving the set of bits for the second package from the previous device.

Clause 5. The device of clause 4, wherein, to output the one or more additional sets of bits for the second package, the device is configured to output a packet comprising a payload for the second package.

Clause 6. The device of clause 4, wherein, to output the one or more additional sets of bits for the second package, the device is configured to stream a payload for the second package.

Clause 7. The device of any of clauses 4-6, wherein the device is configured to, after outputting all of the one or more additional sets of bits for the second package, output, to the subsequent device, an empty package indicating a third priority value that is less than the first priority value and less than the second priority value.

Clause 8. The device of any of clauses 1-7, wherein, to output the set of bits for the second package, the device is configured to output at least a portion of a header for the second package, wherein the header comprises one or more of an indication of the device, an indication of the destination device, or a length of a payload for the second package.

Clause 9. The device of any of clauses 1-8, wherein the device comprises: a receiver configured to receive, via a first cable, the set of bits for the first package from the previous device; and a transmitter configured to output, via a second cable different from the first cable, the set of bits for the second package to the subsequent device.

Clause 10. A method comprising: receiving, by a device, a set of bits for a first package from a previous device of a plurality of devices connected in a daisy chain configuration, the set of bits for the first package including a first priority value; if the device does not have a second package for output to a destination device of the plurality of devices connected in the daisy chain configuration, outputting, by the device, the set of bits for the first package to a subsequent device of the plurality of devices connected in the daisy chain configuration; and when the device has the second package for output to the destination device of the plurality of devices connected in the daisy chain configuration: determining, by the device, whether a second priority value for the second package is higher than the first priority value; if the second priority value is higher than the first priority value: refraining, by the device, from outputting the set of bits for the first package to the subsequent device of the plurality of devices connected in the daisy chain configuration; and outputting, by the device, a set of bits for the second package to the subsequent device of the plurality of devices connected in the daisy chain configuration.

Clause 11. The method of clause 10, further comprising: processing, by the device, the first package if the first package is for the device; and outputting, by the device, the set of bits for the first package to the subsequent device of the plurality of devices connected in the daisy chain configuration unless the device has the second package for output to the destination device and if the second priority value is higher than the first priority value.

Clause 12. The method of any of clauses 10-11, further comprising, if the second priority value is lower than the first priority value, outputting, by the device, the set of bits for the first package to the subsequent device of the plurality of devices connected in the daisy chain configuration.

Clause 13. The method of any of clauses 10-12, further comprising: after transmitting the set of bits for the second package, receiving, by the device, the set of bits for the second package from the previous device; and outputting, by the device, one or more additional sets of bits for the second package based on receiving the set of bits for the second package from the previous device.

Clause 14. The method of clause 13, wherein outputting the one or more additional sets of bits for the second package comprises outputting a packet comprising a payload for the second package.

Clause 15. The method of clause 13, wherein outputting the one or more additional sets of bits for the second package comprises streaming a payload for the second package.

Clause 16. The method of clauses 13-15, further comprising, after outputting all of the one or more additional sets of bits for the second package, outputting, by the device and to the subsequent device, an empty package indicating a priority that is less than the first priority value and less than the second priority value.

Clause 17. A system comprising: a plurality of devices connected in a daisy chain configuration, the plurality of devices comprising a previous device, a device, and a subsequent device, wherein the device is configured to receive data from the previous device and to transmit data to the subsequent device; wherein the device is configured to: receive a set of bits for a first package from the previous device of the plurality of devices connected in the daisy chain configuration, the set of bits for the first package including a first priority value; and if the device does not have a second package for output to a destination device of the plurality of devices connected in the daisy chain configuration, output the set of bits for the first package to the subsequent device of the plurality of devices connected in the daisy chain configuration; and when the device has the second package for output to the destination device of the plurality of devices connected in the daisy chain configuration: determine whether a second priority value for the second package is higher than the first priority value; if the second priority value is higher than the first priority value: refrain from outputting the set of bits for the first package to the subsequent device of the plurality of devices connected in the daisy chain configuration; and output a set of bits for the second package to the subsequent device of the plurality of devices connected in the daisy chain configuration.

Clause 18. The system of clause 17, wherein the second priority value is different from each respective priority value assigned to other devices of the plurality of devices.

Clause 19. The system of clause 17, wherein the first priority value is assigned to a source device of the plurality of devices that generated the first package.

Clause 20. The system of clauses 17-20, wherein the device is configured to process the first package if the first package is for the device, and to output the set of bits for the first package to the subsequent device of the plurality of devices connected in the daisy chain configuration unless the device has the second package for output to the destination device and if the second priority value is higher than the first priority value.

In one or more examples, the functions being performed described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this way, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various aspects have been described in this disclosure. These and other aspects are within the scope of the following claims.

The invention claimed is:

1. A device configured to:
receive a set of bits for a first package from a previous device of a plurality of devices connected in a daisy chain configuration, the set of bits for the first package including a first priority value; and
if the device does not have a second package for output to a destination device of the plurality of devices connected in the daisy chain configuration, output the set of bits for the first package to a subsequent device of the plurality of devices connected in the daisy chain configuration; and
when the device has the second package for output to the destination device of the plurality of devices connected in the daisy chain configuration:
determine whether a second priority value for the second package is higher than the first priority value;
if the second priority value is higher than the first priority value:
refrain from outputting the set of bits for the first package to the subsequent device of the plurality of devices connected in the daisy chain configuration;
output a set of bits for the second package to the subsequent device of the plurality of devices connected in the daisy chain configuration; and
after outputting all sets of bits for the second package, output, to the subsequent device, an empty package indicating a third priority value that is less than the first priority value and less than the second priority value.

2. The device of claim 1, wherein the device is configured to process the first package if the first package is for the device, and to output the set of bits for the first package to the subsequent device of the plurality of devices connected in the daisy chain configuration unless the device has the second package for output to the destination device and if the second priority value is higher than the first priority value.

3. The device of claim 1, wherein the device is configured to, if the second priority value is lower than the first priority value, output the set of bits for the first package to the subsequent device of the plurality of devices connected in the daisy chain configuration.

4. The device of claim 1, wherein the device is further configured to, after transmitting the set of bits for the second package and before outputting the empty package:
receive the set of bits for the second package from the previous device after the second package has passed around the plurality of devices connected in the daisy chain configuration; and
output one or more additional sets of bits for the second package based on receiving the set of bits for the second package from the previous device.

5. The device of claim 4, wherein, to output the one or more additional sets of bits for the second package, the device is configured to output a packet comprising a payload for the second package.

6. The device of claim 4, wherein, to output the one or more additional sets of bits for the second package, the device is configured to stream a payload for the second package.

7. The device of claim 1, wherein, to output the set of bits for the second package, the device is configured to output at least a portion of a header for the second package, wherein the header comprises one or more of an indication of the device, an indication of the destination device, or a length of a payload for the second package.

8. The device of claim 1, wherein the device comprises:
a receiver configured to receive, via a first cable, the set of bits for the first package from the previous device; and
a transmitter configured to output, via a second cable different from the first cable, the set of bits for the second package to the subsequent device.

9. A method comprising:
receiving, by a device, a set of bits for a first package from a previous device of a plurality of devices connected in a daisy chain configuration, the set of bits for the first package including a first priority value;
if the device does not have a second package for output to a destination device of the plurality of devices connected in the daisy chain configuration, outputting, by the device, the set of bits for the first package to a subsequent device of the plurality of devices connected in the daisy chain configuration; and
when the device has the second package for output to the destination device of the plurality of devices connected in the daisy chain configuration:
determining, by the device, whether a second priority value for the second package is higher than the first priority value;
if the second priority value is higher than the first priority value:
refraining, by the device, from outputting the set of bits for the first package to the subsequent device of the plurality of devices connected in the daisy chain configuration;
outputting, by the device, a set of bits for the second package to the subsequent device of the plurality of devices connected in the daisy chain configuration; and
after outputting all sets of bits for the second package, outputting, by the device and to the subsequent device, an empty package indicating a third priority value that is less than the first priority value and less than the second priority value.

10. The method of claim 9, further comprising:
processing, by the device, the first package if the first package is for the device; and
outputting, by the device, the set of bits for the first package to the subsequent device of the plurality of devices connected in the daisy chain configuration unless the device has the second package for output to the destination device and if the second priority value is higher than the first priority value.

11. The method of claim 9, further comprising, if the second priority value is lower than the first priority value, outputting, by the device, the set of bits for the first package to the subsequent device of the plurality of devices connected in the daisy chain configuration.

12. The method of claim 9, further comprising, after transmitting the set of bits for the second package and before outputting the empty package:
receiving, by the device, the set of bits for the second package from the previous device; and
outputting, by the device, one or more additional sets of bits for the second package based on receiving the set of bits for the second package from the previous device.

13. The method of claim 12, wherein outputting the one or more additional sets of bits for the second package comprises outputting a packet comprising a payload for the second package.

14. The method of claim 12, wherein outputting the one or more additional sets of bits for the second package comprises streaming a payload for the second package.

15. A system comprising:
a plurality of devices connected in a daisy chain configuration, the plurality of devices comprising a previous device, a device, and a subsequent device, wherein the device is configured to receive data from the previous device and to transmit data to the subsequent device;
wherein the device is configured to:
receive a set of bits for a first package from the previous device of the plurality of devices connected in the daisy chain configuration, the set of bits for the first package including a first priority value; and
if the device does not have a second package for output to a destination device of the plurality of devices connected in the daisy chain configuration, output the set of bits for the first package to the subsequent device of the plurality of devices connected in the daisy chain configuration; and
when the device has the second package for output to the destination device of the plurality of devices connected in the daisy chain configuration:
determine whether a second priority value for the second package is higher than the first priority value;
if the second priority value is higher than the first priority value:

refrain from outputting the set of bits for the first package to the subsequent device of the plurality of devices connected in the daisy chain configuration;

output a set of bits for the second package to the subsequent device of the plurality of devices connected in the daisy chain configuration; and after outputting all sets of bits for the second package, output, to the subsequent device, an empty package indicating a third priority value that is less than the first priority value and less than the second priority value.

16. The system of claim 15, wherein the second priority value is different from each respective priority value assigned to other devices of the plurality of devices.

17. The system of claim 15, wherein the first priority value is assigned to a source device of the plurality of devices that generated the first package.

18. The system of claim 15, wherein the device is configured to process the first package if the first package is for the device, and to output the set of bits for the first package to the subsequent device of the plurality of devices connected in the daisy chain configuration unless the device has the second package for output to the destination device and if the second priority value is higher than the first priority value.

* * * * *